United States Patent
Pillin et al.

(12) 
(10) Patent No.: US 6,355,085 B1
(45) Date of Patent: Mar. 12, 2002

(54) METHOD AND DEVICE FOR SEPARATING PARTICLES FROM AN ELECTRICALLY CONDUCTIVE LIQUID FLOW USING ELECTROMAGNETIC FORCES

(75) Inventors: Béatrice Pillin, Echirolles; Pascale Gillon, Grenoble; Eric Beaugnon, Gieres, all of (FR)

(73) Assignee: Centre National de la Recherche Scientifique, Paris (FR)

( * ) Notice: Subject to any disclaimer, the term of this patent is extended or adjusted under 35 U.S.C. 154(b) by 0 days.

(21) Appl. No.: 09/117,365
(22) PCT Filed: Feb. 6, 1997
(86) PCT No.: PCT/FR97/00235
  § 371 Date: Jan. 5, 1999
  § 102(e) Date: Jan. 5, 1999
(87) PCT Pub. No.: WO97/28901
  PCT Pub. Date: Aug. 14, 1997

(30) Foreign Application Priority Data

Feb. 7, 1996 (FR) ............................... 96 01711

(51) Int. Cl.$^7$ .................................................. C22B 9/22
(52) U.S. Cl. ...................... 75/10.67; 210/222; 210/695; 266/227
(58) Field of Search ......................... 266/227; 75/10.67; 210/695, 222

(56) References Cited

FOREIGN PATENT DOCUMENTS

| GB | 1317736 | * | 5/1973 |
| GB | 2228431 A | * | 8/1990 |

* cited by examiner

*Primary Examiner*—Roy King
*Assistant Examiner*—Tima McGuthry-Banks
(74) *Attorney, Agent, or Firm*—Connolly Bove Lodge & Hutz LLP

(57) ABSTRACT

A method for separating inclusions from an electrically conductive liquid flow using electromagnetic forces, wherein the inclusions and the liquid have differing electrical conductivities. The flow is exposed to a spatially heterogeneous magnetic flux produced by a continuous static magnetic field.

14 Claims, 3 Drawing Sheets

Figure 1A:
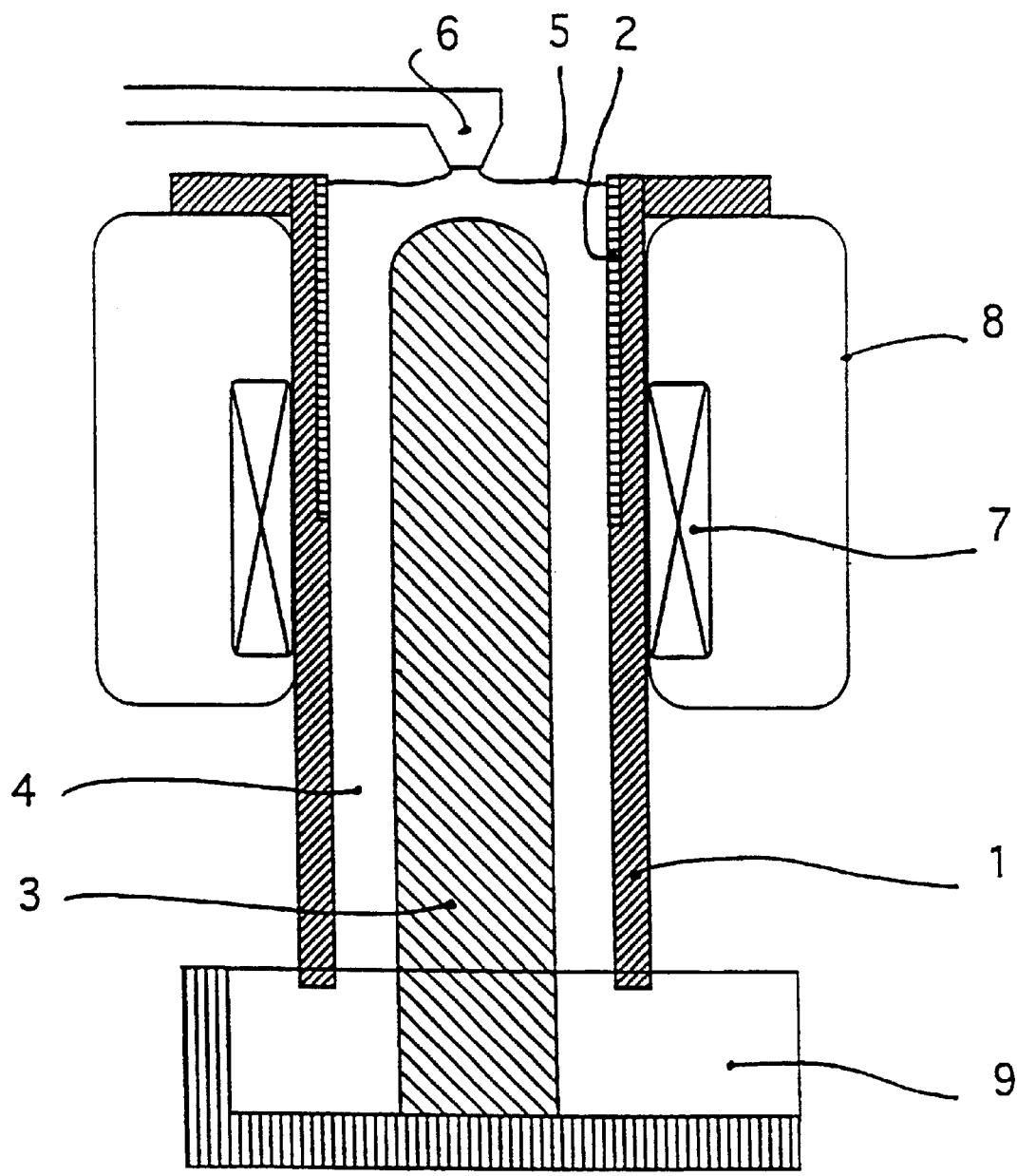

METHOD AND DEVICE FOR SEPARATING PARTICLES FROM AN ELECTRICALLY CONDUCTIVE LIQUID FLOW USING ELECTROMAGNETIC FORCES

TECHNICAL DOMAIN

The domain of this invention relates to the separation of immiscible inclusions (solids, liquids, gasses) contained in a stream of electricity conducting liquid, the particles having a different electrical conductivity to to that of the liquid, by means of electromagnetic forces obtained by means of a static magnetic field, and particularly inclusions contained in a liquid metal stream such as aluminum.

STATE OF THE ART

Patent FR 2614801 describes a process for separation of inclusions contained in a liquid metal that consists of applying a field of electromagnetic forces to a filter medium (for example a porous mass, gravel bed, filter plug, etc.) through which the liquid metal passes, the electromagnetic forces being obtained:

either by means of a DC current passing through the liquid metal being filtered and directed parallel to the liquid metal flow; the electromagnetic forces causing migration of inclusions towards the walls delimiting the pores of the filter medium result from the action of the static magnetic field created by the DC current on the DC current itself, or by means of a DC current and a static magnetic field perpendicular to the filtration direction; in this case, static electromagnetic forces also result from the action of the static magnetic field on the DC current.

U.S. Pat. No. 4,909,836 and document J. of—Metals vol. 47 number 5 p. 46 (May 1995) also describe a process for separation of inclusions in a liquid metal by the action of an alternating magnetic field on a liquid metal flow passing through a chamber containing longitudinal channels separated by baffles; the purpose of this configuration with channels is to hinder and attenuate mixing or convection effects that only occur when an alternating field is used; inclusions larger than 40 um are recovered on the baffles or on the walls of the chamber; the metal thus treated then passes into a filter which recovers smaller inclusions.

Another known method, for example described in U.S. Pat. No. 5,238,051, is to continuously pour steel slabs with a rectangular cross-section in the presence of a static continuous magnetic field applied usually on the mold; this field is necessarily in the direction perpendicular to the liquid metal flow, and reduces the speed at which the said liquid metal is added into the casting mold and into the slab solidification pit during solidification. Although in some ways this type of process improves the quality of the cast metal, it does no more than prevent polluting solid inclusions from being drawn deep into the solidification pit with the liquid metal stream. Thus, inclusions settle more easily due to the high density of liquid steel and concentrate mostly on the surface of the slab to the extent that it is usually necessary to remove an external skin of metal in order to eliminate them after solidification.

This type of settlement hardly occurs with liquid aluminum because its density is much lower and the solidification pit is much shallower (of the order of 10 times less).

The fields applied are usually less than 0.4 T, the electromagnetic forces applied to the liquid metal acting in the direction opposite to its flow direction.

The applicant attempted to simplify separation of liquid metal inclusions by avoiding the use of filter media that are never simple to use and the effectiveness of which is uncertain particularly for the smallest inclusions due to problems in clogging and subsequent release of the said inclusions.

The applicant also attempted to reduce the quantity of inclusions present in the liquid metal after all known filtration processes had been applied to it, while avoiding the inconvenient use of an externally generated electrical current passing through the said liquid metal.

The applicant also attempted to separate the smallest inclusions, particularly smaller than 40 $\mu$m which could not be retained by known filtration processes, and therefore to improve the quality of the liquid metal.

DESCRIPTION OF THE INVENTION

A first aspect of the invention is a process for separation of inclusions contained in an electricity conducting liquid stream, the inclusions and the liquid having different electrical conductivities, by means of electromagnetic forces characterized in that the said flow is subjected to a heterogeneous magnetic flux in space, the said magnetic flux resulting from a continuous static magnetic field.

The process can thus deviate all inclusions in the same direction, generally radial within the moving liquid and usually confined within an appropriate chamber so that they can be concentrated in a part of the stream (usually near the boundary) and then recovered from this area, the rest of the flow thus being free of inclusions.

The process is applicable to all liquid metals including steel, copper, etc.), but particularly to Light metals or liquids such as aluminum, magnesium, sodium and their alloys, and to aqueous saline solutions, molten salts, etc., when their low density does not have much effect on the separation of inclusions by settlement.

Inclusions may be solid, liquid or gaseous and are generally electrically insulating. They may be derived from earlier processing of the liquid metal.

In the case of a liquid metal, the processing according to the invention is preferably done immediately before casting. It is particularly useful to insert the process and its device adjacent to the casting nozzle.

If separation is to take place, the electromagnetic forces due to the action of the continuous static field on the induced current generated within the conducting liquid stream, due to the magnetic flux which is variable in space, must exert sufficient pressure on the inclusions that move within the said liquid. It appears that this separation is completely different from a settlement.

Therefore for example, the electromagnetic force field is not the result of the action of an alternating magnetic, field on the current induced by the said alternating magnetic field in a conducting medium, but is the result of the movement of the conducting metal within spatial gradient of a continuous magnetic flux.

Similarly, deviation of inclusions cannot be due to electromagnetic forces acting directly on inclusions, these electromagnetic forces resulting from the action of a continuous magnetic field on a current induced in the said inclusions by their movement within a gradient of the said continuous field, since the said inclusions are insulating.

In easy cases in which the inclusions are electrically insulating, the forces exerted will be particularly high and separation will be easier.

The magnetic field is normally symmetric, and will beneficially be greater than 1 T; but the most important factor is that the variation of the flux with time due to the liquid metal stream in the spatial flux gradient is sufficient to generate electromagnetic forces within the conducting liquid in order to deviate the inclusions by reaction as far as the outside boundary or towards the center of the said flow or its inside boundary. The variation of the flux with time generally exceeds $25.10^{-6}$ Wb/s.

The heterogeneous magnetic flux in space may be obtained by means of a spatial gradient or variation of the magnetic field in the stream. But it is more advantageous to obtain it by varying or modifying the shape of the cross-section of the stream, along the stream.

Results may be improved by combining the use of a variable field in space and a variable stream cross-section such that their effects on inclusions are additive.

The magnetic field may be obtained by means of at least one or a pair of permanent magnets or DC electromagnets. In particular, a coil surrounding the said stream is frequently used. It is advantageous to use superconducting coils or electromagnets to obtain sufficiently high fluxes.

In the case of a coil surrounding the stream, eletromagnetic forces are obtained capable of deviating inclusions in a radial direction perpendicular to the general direction of the said stream.

When a heterogeneous flux obtained by means of a spatial magnetic field gradient is used, it is particularly advantageous to use an annular flow in which the cross-section is a ring with a constant cross-section along the stream. For example, this cross-section may be circular or rectangular, such that the stream passes through the areas with the most intense magnetic field and field gradient, and to minimize the radial distance to be traveled by inclusions to separate them by moving them to the outside or inside periphery of the said annular flow.

The shape of the cross-section of the ring may be identical along the stream, or it may vary. A variable cross-section is particularly suitable when the magnetic field is uniform to obtain a variable magnetic flux in space; it can also be used when the magnetic field has a spatial gradient to increase the heterogeneous magnetic flux in the liquid and therefore to improve separation of inclusions. One particularly advantageous embodiment is to use a stream with a circular annular cross-section, and a conical or truncated cross-section in the direction of flow.

Thus, a stream in which the shape of the cross-section varies along the direction of flow may be obtained by delimiting the said flow, for example by using two conical segments with the same taper angle nested, one inside the other, but leaving a space between them. The two conical segments could also have different taper angles and their cross-sections could be identical (for example circular or square) or different (for example circular and square, oval and rectangular, etc.), concentric or not concentric, etc.

In all cases, it is important that the stream avoids the central part of the magnetic flux which is inefficient for separating inclusions.

The direction of the field is indifferent. However, this direction is generally such that the flux variation obtained generates an electromagnetic force field within the conducting liquid oriented in the direction opposite to the direction in which the inclusions with the lowest conductivity are to be Thus in the case of a coil surrounding a stream with a constant annular cross-section, the inclusions are recovered on the outside boundary if the liquid is moving from an area with a less intense field towards an area with a more intense field (positive flux variation) and vice versa to recover them on the inside boundary or the center. In the case of a conical stream converging along the stream, the inclusions are recovered towards the inside of the stream regardless of the direction of the field, in any case the field being generally parallel to the direction of flow. In this case the spatial flux variation is negative.

In other words, a positive variation of the magnetic flux along the direction of flow deviates inclusions towards the outside, whereas a negative variation deviates them towards the inside.

Different means are available for recovering and eliminating the deviated inclusions from the liquid stream. For example, a porous material (refractory when Processing liquid metals) may be placed in the recovery area at the boundary of the stream, to hold and trap inclusions.

It would also be possible to install deflectors, or any other pick-up means in the recovery area to deviate and draw of the part of flow containing deviated inclusions, and also to recover the other purified part.

Figure 1B:
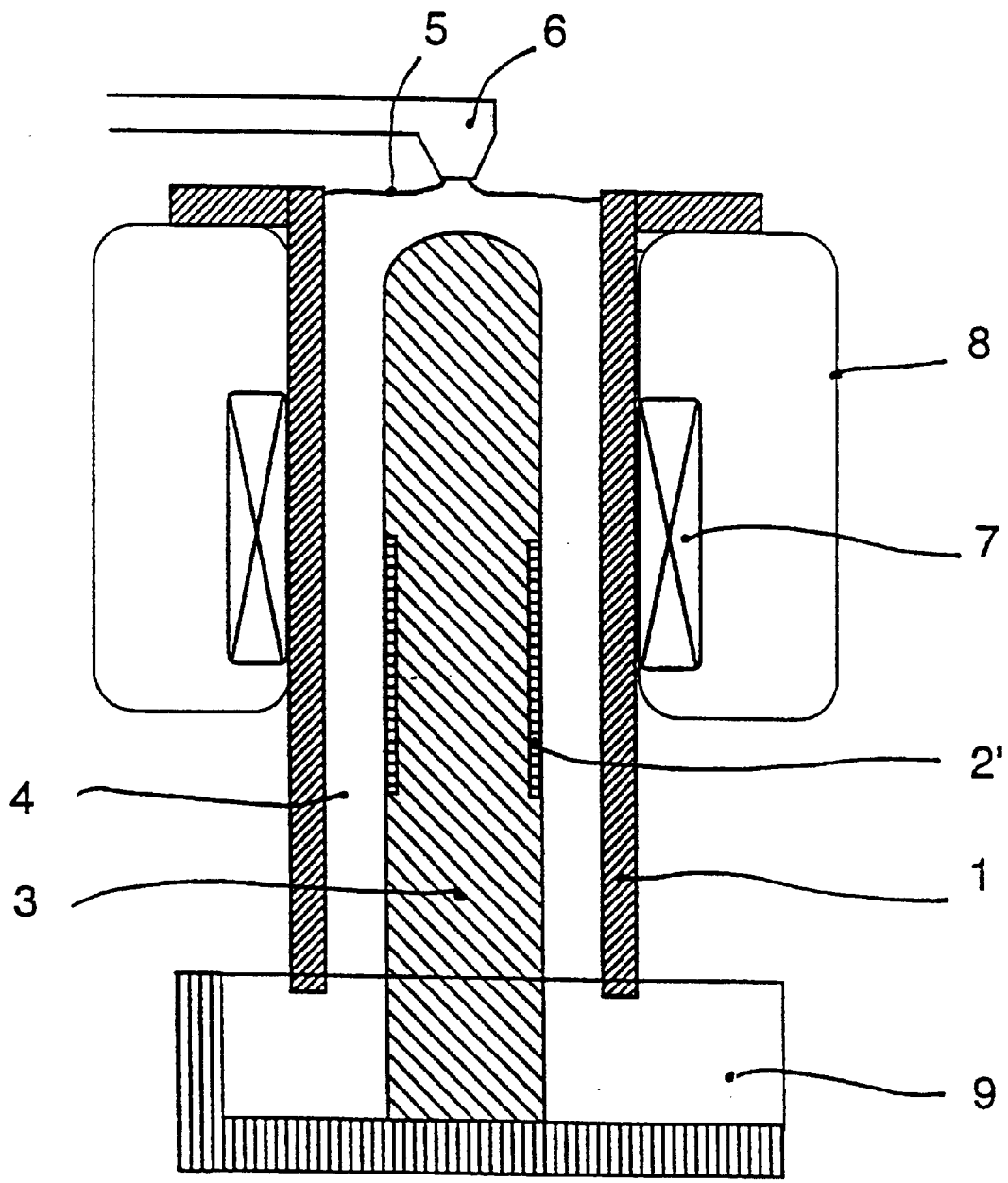

FIGS. 1*a* and 1*b* illustrate the invention and make it easier to understand.

In FIGS. 1*a* and 1*b*, the shape of the cross-section of the stream channel is annular and constant. It comprises an outside envelope (1) and a core (3) located at the center of the outside envelope (1) in order, to form the annular flow (4) with a constant cross-section (circular ring). It is supplied with liquid metal, the level (5) of the liquid metal being visible through nozzle (6).

In version 1*a*, inclusions are recovered in the upper part of the stream, in an area in which the spatial flux variation is positive in the direction of flow of the liquid metal, by means of a porous refractory coating (2) located on the inside surface of the envelope (1).

In version 1*b*, recovery is done in the lower part of the stream in an area in which the flux variation is negative, the porous refractory coating (2') then being located on the core (3).

(7) shows a superconducting coil in its cryogenic envelope (8). It produces a static magnetic field (H) in the general direction parallel to the line of flow, with a spatial gradient mainly close to the ends of the coil (7).

There is thus a heterogeneous magnetic flux in the annular stream with a constant cross-section and the conducting liquid is the source of an electromagnetic force field F acting by reaction on inclusions that are pushed along direction D (radial outwards or inwards) to be trapped by the porous refractory (2'). The force is higher when the flux variation is higher, in other words when the spatial magnetic field gradient is high and the field is high, that is to say close to the ends of the coil and the outside envelope of the channel. The purified liquid is removed at (9).

In the case of a liquid aluminum stream containing electrically insulating inclusions with a maximum diameter of 35 $\mu$m contained within a circular annular stream 20 mm across with a constant average radius of 40 mm inside a 26 cm high coil (7) generating a magnetic field of 3.5 T at its center, at a speed of 24 cm/sec (flow of 10 t/h), the upstream pressure being about 1 bar, being about 4.5 m between (5) and (9), a complete deviation of the inclusions is observed.

The same equipment used with a stream of liquid copper, containing 20 $\mu$m inclusions at a speed of 13 cm/sec has an efficiency of 75%.

Figure 2:
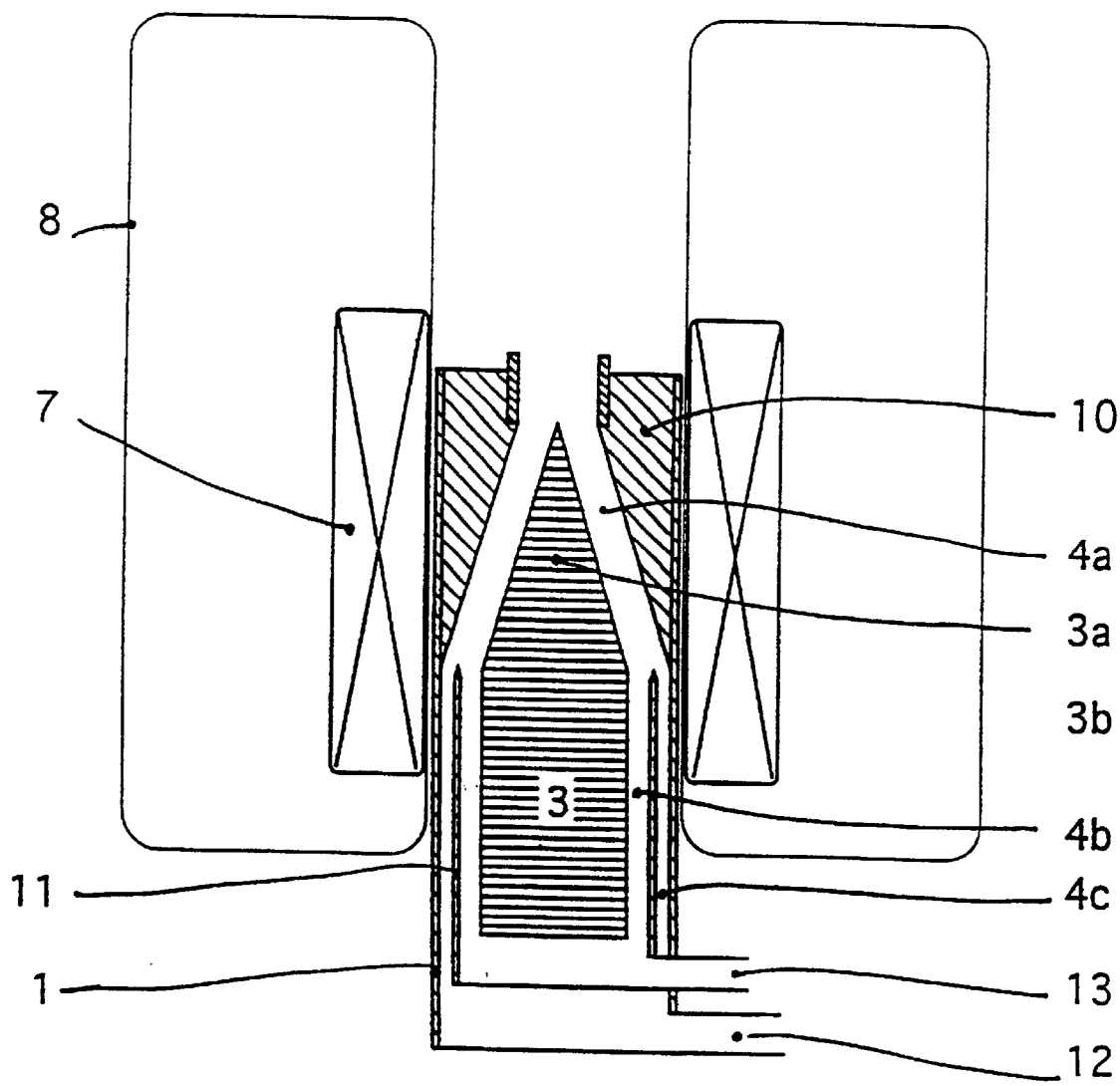

FIG. 2 shows another embodiment of the invention in which the variable magnetic flux is also obtained by varying the shape of the cross-section of the stream; particles are recovered by deflector.

In its upper part, the outer envelope (1) is in the shape of a divergent truncated cone (10) in which the upper conical part (3*a*) of the core (3) is located, thus delimiting a divergent conical annular portion of the stream (4*a*). The upper conical part (3*a*) is prolonged in its lower part by a cylindrical part (3*b*) concentric with the outer envelope (1) delimiting a circular annular portion of the stream (4*b, c*) with constant shape.

The outer envelope (1) is surrounded by a coil (7), the median part of which is located at the height of the upper conical annular stream (4*a*). The coil creates a static continuous field in the vertical, upwards or downwards indifferently.

The median part of the coil corresponding to the conical portion of the stream (4*a*) outputs a maximum magnetic field and has little or no spatial gradient. Thus the heterogeneous magnetic flux in the stream, and therefore the deviation of the inclusions, is obtained by the variation in the shape of the cross-section of the stream due to its conical shape.

In the case in point with a divergent cone, the flux variation is positive and inclusions are deviated towards the outside wall of the conical stream.

Inclusions are separated by means of a deflector (11) that separates the stream into two streams at the outlet from the conical stream portion (4*a*), the outer stream (4*b*) containing deviated inclusions, and the inner stream (4*c*) being purified. The stream containing inclusions (4*b*) is recovered at (12) and the purified stream is recovered at (13).

Note that several successive magnetic fields may be applied along a metal stream in order to complete the treatment of part of the stream, for example the stream containing impurities In order to concentrate them, or the purified stream to further improve its purification if necessary.

Another aspect of the invention is a device for the separation of inclusions contained in an electricity conducting liquid stream, the inclusions and the liquid having different electrical conductivities, comprising a means or container to channel the stream, a magnetic means to create a heterogeneous continuous magnetic flux in the said stream; this means generally includes at least one or a pair of permanent magnets or DC electromagnets, or a DC coil surrounding the container, the said electromagnet or the said coil advantageously being superconductors.

The heterogeneous magnetic flux may be obtained using a magnetic means producing a spatial gradient with a continuous static magnetic field within the stream or by means of a container comprising means of varying the shape of the cross-section along the said stream; these two means may be combined.

What is claimed is:

1. A process for separation of inclusions contained in an electricity conducting liquid stream, the inclusions and the liquid having different electrical conductivities, by means of electromagnetic forces, said process including the step of subjecting said stream to a heterogeneous magnetic flux which is heterogeneous in space, said magnetic flux being the result of a continuous static magnetic field.

2. The process according to claim 1, wherein the heterogeneous magnetic flux and the liquid metal stream are such that a flux variation in said stream exceeds $25 \times 10^{-6}$ Wb/s.

3. The process according to claim 1, wherein the heterogeneous magnetic flux is obtained by spatial variation of the magnetic field in the stream.

4. The process according to claim 1, wherein the heterogeneous magnetic flux is obtained by varying the shape of the cross-section of the stream along said stream.

5. The process according to claim 1, wherein the heterogeneous magnetic flux is obtained by spatial variation of the magnetic field in the stream and varying the shape of the cross-section of said stream along said stream.

6. The process according to claim 1, wherein the stream is annular.

7. The process according to claim 6, wherein the cross-section of the annular stream is constant throughout its length.

8. The process according to claim 1, wherein the stream is conical.

9. The process according to claim 1, wherein the magnetic field is obtained by means of at least one electromagnet or coil surrounding the stream, with a DC power supply.

10. The process according to claim 9, wherein said at least one electromagnet or coil is a super conducting electromagnet or coil.

11. A device for separating inclusions, comprising:

conduit means; means for introducing, into the conduit means, a stream of electrically conducting liquid containing the inclusions, the inclusions and liquid having different electrical conductivities;

field means for creating a continuous static magnetic field of heterogeneous flux along a length over the conduit means for providing a path for the liquid stream to flow and having outlet means for the liquid stream from which the inclusions have been separated in response to the flux through which the stream passes.

12. The device according to claim 11, wherein said magnetic means of creating a heterogeneous magnetic flux comprises at least one coil surrounding the stream through which a continuous electrical current passes.

13. The device according to claim 11, wherein a cross-section of the conduit means through which the stream passes is annular.

14. The device according to claim 11, wherein the means through which the stream passes is conical along a direction of the stream, thus producing the heterogeneous magnetic flux.

* * * * *